United States Patent

[15] 3,645,164
[45] Feb. 29, 1972

[54] RIVET STRIP FOR A DRIVING-IN DEVICE

[72] Inventor: Horst Wurth, Heutingsheim, Germany

[73] Assignee: Walter Schnabel, Im Wolfsgalgen, Germany

[22] Filed: Mar. 13, 1970

[21] Appl. No.: 19,453

[30] Foreign Application Priority Data

Mar. 13, 1969    Germany ..................... P 19 12 695.5

[52] U.S. Cl. .................................. 85/17, 85/21, 206/56 DF
[51] Int. Cl. .................................... F16b 15/06, F16b 15/08
[58] Field of Search ..................... 85/17, 16, 10, 21, 18, 15, 85/13; 206/56 DF, 56 AB, 46 H

[56] References Cited

UNITED STATES PATENTS

| 197,513 | 11/1877 | Gross | 85/10 |
| 1,617,818 | 2/1927 | Mackenzie | 85/16 X |
| 2,428,259 | 9/1947 | Anstett | 85/21 |
| 3,348,669 | 10/1967 | Powers | 85/17 |
| 3,481,459 | 12/1969 | Becht | 85/17 X |
| 3,492,907 | 2/1970 | Hauck | 85/17 |

Primary Examiner—Ramon S. Britts
Attorney—Richard Low

[57] ABSTRACT

A rivet strip for driving-in or stapling device in which one-piece rivets provided with a head, a shaft and a stop element in the tip of the shaft having a shoulder facing the head. The individual rivets have their attachment side formed as planar sliding surfaces extending over the head shaft and stop elements. The individual rivets have one attachment side formed as a planar sliding surface and another attachment side in the region of the head and/or the stop elements which extend in an edge or pointed shape. The upper surface of each of the rivet heads lie in a common plane whereby the edge or point of the rivets are connected with the sliding surface of the strip.

6 Claims, 4 Drawing Figures

PATENTED FEB 29 1972　　　3,645,164

INVENTOR
HORST WURTH
BY　Murray Schaffer
ATTORNEY

RIVET STRIP FOR A DRIVING-IN DEVICE

The present invention concerns a rivet strip for a driving-in device, in which the individual rivets support a head, a stepped shaft and at the tip of the shaft a stop element and over the heads and/or stop elements are gathered integrally. Such rivets are used especially to connect a surface cover foil laid around a tubular insulation.

In practice the cover foils are held together via such connecting elements in the surface covering of tubular insulations. For technological considerations it has been found expedient for the individual rivets to be formed into a rivet strip. Thus, processing such a rivet strip by means of an inserting and driving-in device plays a decisive part, since inserting the rivets with such a device considerably reduces the effort when applying the cover foil.

Known rivet strips, however, are unsuitable for use in a driving-in device, since the guiding of the rivet strip during feed in the magazine of the device is not safe in operation and the separation of the rivets at the end of the strip also causes difficulties. Since the shaft of the rivet is stepped both towards the head and the stop element, operational breakdowns on separation and the movement of the rivet thereby at right angles to the strip of rivets are unavoidable.

To avoid such operational breakdowns occurring at the driving-in device, there has also been developed a stackable single rivet with two supporting surfaces. The rivets are produced singly and subsequently charged into a magazine, strips being formed by an additional adhesive or weld seam. Such strips of rivets produced are very costly on account of the various operations and are not an economical proposition as a mass production connecting element.

A rivet strip in the form of an extrusion section is also known from which the individual rivets are obtained by separation. Producing such rivet strips is indeed simple, the difficulties however have shifted to the driving-in device. Besides the driving-in device a separating device has also to be provided which, when the rivet is driven home, separates a part section of the extrusion section. Conventional driving-in devices cannot be used. Since the choice of material for the rivets poses a further problem, the installation of the separating device in a driving-in device involves further difficulties. Driving home the rivets by puncturing the plastics material foil necessitates an impact-resistant material, which in turn is severed with difficulty from an extruded section.

It is an object of the invention to provide a rivet strip for a driving-in device which is readily produced integrally and at low costs, and which can be reliably guided in conventional driving-in devices and in which the individual rivets may be removed without additional separating device and without interruption.

According to the present invention a rivet strip for a driving-in device, in which the individual rivets have a head, a stepped shaft and a stop element at the tip of the shaft and by means of the heads and/or the stop element are integrally assembled, is characterized by the feature that in the individual rivets one attachment side is formed as a sliding surface extending over head, shaft and stop member, whilst the other attachment side in the region of the head and/or the stop element extends edge-shaped and pointlike and that these edges or points of a rivet are connected to the sliding surface of the subsequent rivet in the strip. Such a rivet strip is easily and cheaply produced in one operation, e.g., by way of the injection moulding method. Attaching together of the individual rivets in this form leads to a compact strip which can be guided perfectly in a magazine of a driving-in device. This development of the connecting points necessitates little force for separating the individual rivets from the strip. Therefore separation may occur simultaneously with the driving in. Although the shaft of the rivet is stepped towards the head and the stop element, no operational breakdown can occur by it becoming hooked up with the adjacent rivet, since the sliding surface prevents this.

The invention will now be described further, by way of example, with reference to the accompanying drawings, in which.

Figure 2:
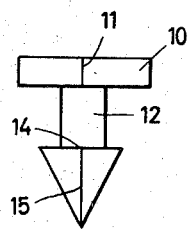
FIG. 2 is a view of the attachment side of a single rivet.
Figure 1:
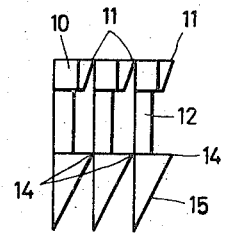
FIG. 1 is a side view of the rivet strip constructed in accordance with the invention.
Figure 3:
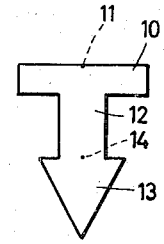
FIG. 3 is a view of the opposite attachment side of a single rivet.
Figure 4:
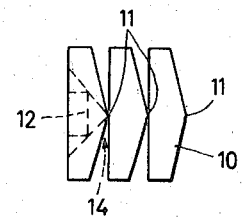
FIG. 4 is a plan view of the rivet strip of FIG. 1.

An individual rivet comprises a head 10, a shaft 12 and a stop element 13 located on the shaft end. The left-hand attachment side of the individual rivets (FIG. 1) is formed as a flat sliding surface which embraces both the head 10, the shaft 12 and the stop element 13, as shown more particularly in FIG. 2. The head 10 projects beyond the shaft 12 in three directions, so as to provide a sufficiently large stepped surface which prevents puncturing when being driven into a cover foil or the like. On the right-hand attachment side of an individual rivet, the head 10 is formed to extend in rooflike formation. The projection may be formed as central edge over the height of the head 10 or also only as point 11 in the region of the cover surface of the head 10. A pointlike projection facilitates the separation of the rivets from the strip. It suffices to bevel the edge towards the rivet axis to obtain this pointlike projection of the head 10.

The stop element 13 is formed as a three-sided pyramid adjacent to the stepped shaft 12. One side surface of this pyramid is fully supported against the sliding surface of the left-hand attachment side of a rivet. The two other side surfaces via a side edge 15 form a projecting point 14, which preferably lies in plane with the projection point 11 which extends parallel to the sliding surface. The parts of the pyramid base projecting on three sides beyond the shaft 12 forms stop shoulders which secure an inserted rivet in the cover foil.

The individual rivets of a strip are aligned in parallel and integrally connected centrally via the projecting points 11 and 14 with the successive rivets in the strip. The strip may be produced as a compact unitary member. When a rivet is separated from this strip, then the projecting points 11 and 14 without hindrance are in sliding engagement along the sliding surface of the adjacent rivet. The tip of the pyramid facilitates driving in in a cover foil or the like.

What I claim is:

1. A rivet strip for a driving-in device, in which the individual one-piece rivets are provided with a head, a stepped shaft and a stop element at the tip of the shaft having a shoulder facing the head, being integrally assembled by means of the heads and/or the stop elements, whereby the strip is formed from a single piece of material and is characterized by the feature that in the individual rivets one attachment side is formed as a planar sliding surface extending over head shaft and stop element, whilst the other attachment side in the region of the head and/or the stop elements extends edge or point-shaped and that the upper surface of each of the rivet heads lie in a common plane whereby these edges or points of the rivet are connected with the sliding surface of the subsequent rivet in the strip.

2. A rivet strip as claimed in claim 1, in which the stop element is formed as a three-sided pyramid, one side surface constituting a part of the sliding surface and the other two side surfaces facing the shaft centrally merge in the attachment point.

3. A rivet strip as claimed in claim 2, in which the parts of the pyramid base surface projecting beyond the shaft act as stop shoulders for the stop element.

4. A rivet strip as claimed in claim 1, in which the head is rectangular on the attachment side of the sliding surface whilst it merges rooflike and forms an attachment edge centrally on the other attachment side.

5. A rivet strip as claimed in claim 4, in which the attachment edge is inclined towards the rivet axis and merges in an attachment.

6. A rivet strip as claimed in claim 1, in which the attachment points of the rivet are located in a plane which extends parallel to the sliding surface thereof.

* * * * *